United States Patent [19]

Norman

[11] Patent Number: 4,902,066
[45] Date of Patent: Feb. 20, 1990

[54] DIRECTIONAL FLOW TAILGATE

[76] Inventor: Jerry D. Norman, P.O. Box 1375, Seminole, Tex. 79360

[21] Appl. No.: 114,077

[22] Filed: Oct. 27, 1987

[51] Int. Cl.⁴ .............................................. B62D 35/00
[52] U.S. Cl. ................. 296/180.1; 296/57.1; 52/473
[58] Field of Search ............... 296/50, 51, 57 R, 1 S, 296/180.1; 52/473

[56] References Cited

U.S. PATENT DOCUMENTS

| | | | |
|---|---|---|---|
| D. 250,014 | 10/1978 | Jensen | 296/50 X |
| 3,438,167 | 4/1969 | Royston Jr. | 52/473 |
| 4,033,619 | 7/1977 | Cox | 296/50 X |
| 4,050,366 | 9/1977 | Wiklund et al. | 52/473 X |
| 4,063,772 | 12/1977 | Kincaid | 296/1 C |
| 4,165,118 | 8/1979 | Jensen | 296/50 |
| 4,201,411 | 5/1980 | Morgan | 296/50 |
| 4,393,629 | 7/1983 | Gasparini et al. | 52/473 X |
| 4,603,996 | 8/1986 | Chen | 403/7 |

OTHER PUBLICATIONS

"Aerogater" Brochure.
Lubbock, Avalance-Journal, Dec. 17, 1987, p. C-7, "Seminole Racer Invents New Gas-Saving Tailgate".

Primary Examiner—Dennis H. Pedder
Attorney, Agent, or Firm—Wendell Coffee

[57] ABSTRACT

A tailgate for a pickup has an opening equal to about 70% of the area of the tailgate. Louvers in the opening direct air from the bed of the pickup downward. The louvers permit vision from the driver of the pickup to below the bed of the pickup behind the bed thereof. The louvers prohibit vision from behind the pickup into the bed. The louvers are held in slotted stanchions by a bolt within the hollow stanchions. Each louver may be independently replaced.

1 Claim, 2 Drawing Sheets

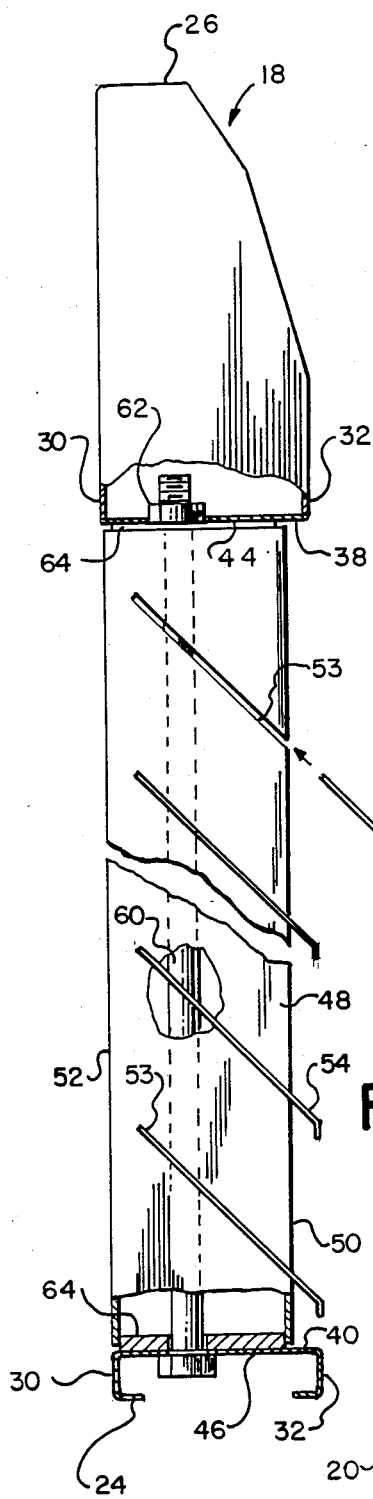
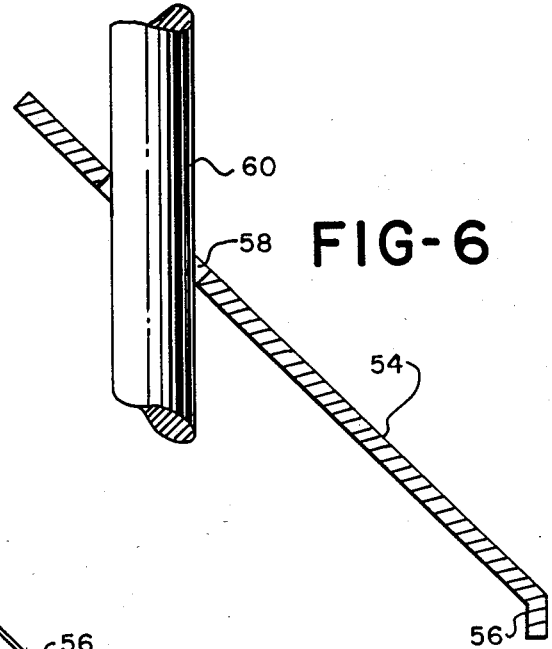
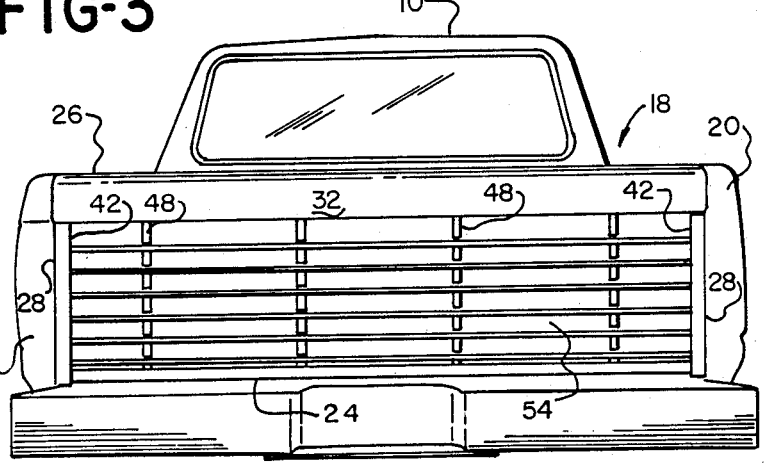
FIG-3
FIG-6
FIG-5

DIRECTIONAL FLOW TAILGATE

BACKGROUND OF THE INVENTION (1) Field of the Invention

This invention relates to vehicles, and more particularly to land vehicles having open top box beds such as pickup trucks. Operators and manufacturers of such vehicles are ones having ordinary skill in this art.

(2) Description of the Related Art

There are a large number of vehicles having open top box type beds. These include trucks, trailers, and particularly pickup trucks. As used herein "pickup" refers to small trucks having open top box beds thereon. Also as used herein, the rear, or end closure of the box is referred to as the "tailgate".

It has long been recognized that such vehicles have poor aerodynamic qualities.

Contrary to popular belief, it is not the air flowing over the cab that creates the major air turbulence in the bed of a pickup. The major cause of the turbulence is the air flowing under the pickup which swirls up directly behind and over the tailgate into the bed. This air, with the air flowing over and around the cab, hits the tailgate and creates more turbulence and drag. An open tailgate or the complete removal of the tailgate from a pickup does not eliminate the turbulence and drag.

Efforts to improve the aerodynamics of pickups include:

| Inventor | Patent Number |
|---|---|
| HARTBERG | 4,353,589 |
| RUZICKA | 4,072,336 |

HARTBERG discloses a pickup having a tailgate made of a screen such as an expanded metal lathe. The screen opens the back of the bed to air, and also for visibility. The driver of the pickup can see objects close to the tailgate. This is particularly desirable inasmuch as it is common for trailers to be towed behind pickups, and when connecting the trailer to the pickup it is desirable that the driver be able to see the trailer tongue as it is near the pickup to make this connection. However, other motorists may see the cargo in the pickup bed.

SUMMARY OF THE INVENTION (1) Progressive Contribution to the Art

I have invented a directional flow tailgate which directs the flow of the air downward from the back of the open box bed. The tailgate according to this design has about five sheet metal louvers which are angled downward as 45°. This downward angle permits good vision by the driver of the pickup to the tongue of a trailer when such is being attached to the pickup. In addition, the downward slope of the louvers prevents people from behind the vehicle from seeing cargo in the bed of the vehicle. Although the bed is open topped, for the purpose of appearance, it is desired for people along the road driving behind the pickup not see cargo in the bed of the pickup. The louvers themselves have a pleasing appearance. In addition to their own pleasing appearance, they would also hide any cargo in the pickup bed which was in a messy or disorderly arrangement.

A very important advantage is that the downward flow of the air from the louvers prevents dust and exhaust fumes from the engine of the pickup from boiling up or being carried by turbulence into the bed of the pickup. Persons having experience in driving the pickup know that on dusty roads, the turbulence will cause a great deal of dust to collect onto the floor of the bed.

In addition, pickups are sometimes used for recreational vehicles and sometimes chairs or seats are provided in the open box of the bed of the vehicle for hunters. Often times dogs or other animals are carried in the bed of the pickup. It is desirable that any person or animal in the bed of the pickup not be exposed to the exhaust gasses from the engine of the pickup.

By having the louvers slant downward, the air is discharged from the bed of the pickup downward. The downward motion of the air does not entirely prevent turbulence behind the pickup, but it does reduce turbulence. The remaining turbulence is down and behind the tailgate area of the pickup. The downward flow of air keeps the dust from the tires and the fumes from the tail pipe of the pickup from boiling up and over into the box of the pickup.

Removing 70% of the tailgate surface and directing the air downward keeps the air from under the pickup from swirling up into the bed and creating the turbulence and drag from the airflow over and around the cab.

This is also beneficial when pulling a trailer because the resulting airflow from the pickup bed is directed under the trailer and not a turbulent airflow into the front of the trailer.

(2) Objects of this Invention

An object of this invention is to provide a tailgate for the open box bed of a vehicle.

Another object is to provide such a tailgate which is pleasing in appearance, offers good vision to the driver, and provides good aerodynamic properties.

Further objects are to achieve the above with devices that are sturdy, compact, durable, lightweight, simple, safe, efficient, versatile, ecologically compatible, energy conserving, and reliable, yet inexpensive and easy to manufacture, install, and maintain.

Other objects are to achieve the above with a method that is rapid, versatile, ecologically compatible, energy conserving, efficient, and inexpensive, and does not require highly skilled people to connect, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 3 is a foreshortened sectional view of a tailgate according to this invention.

FIG. 5 is a rear elevational view of a tailgate within a pickup.

FIG. 6 is a sectional view of one louver slat on the bolt. As an aid to correlating the terms of the claims to the exemplary drawing, the following catalog of elements and steps is provided:

Figure 1:
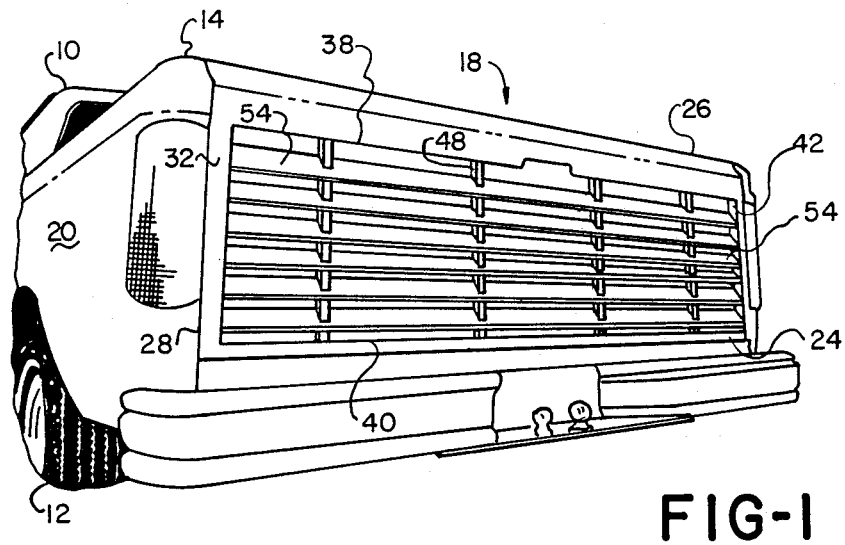
FIG. 1 is a rear perspective view of the pickup with a tailgate according to this invention.
Figure 2:
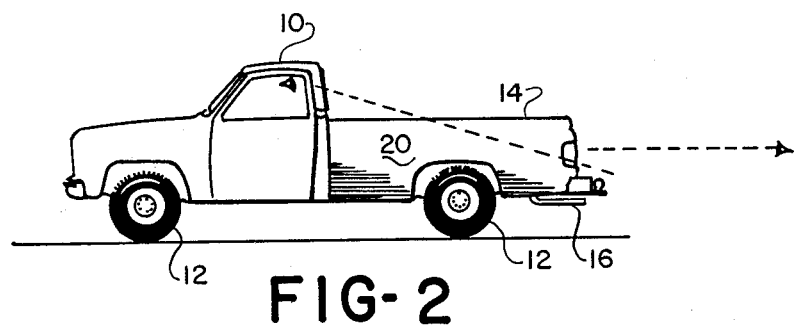
FIG. 2 is a side elevational view somewhat schematic showing lines of vision about a pickup with an improved tailgate therein.

| | | | |
|---|---|---|---|
| 10 | cab | 42 | opening side edges |
| 12 | wheels | 44 | top strip |
| 14 | bed | 46 | bottom strip |
| 16 | tail pipe | 48 | stanchions |
| 18 | tailgate | 50 | back or outside edge |
| 20 | side panels | 52 | inside edge |
| 22 | floor | 53 | slots |
| 24 | gate bottom edge | 54 | louver slats |
| 26 | gate top edge | 56 | flap |
| 28 | gate side edges | 58 | holes |
| 30 | inside panel | 60 | bolts |
| 32 | outside panel | 62 | nuts |
| 38 | opening top edge | 64 | alignment caps |
| 40 | opening bottom edge | | |

DESCRIPTION OF THE PREFERRED EMBODIMENT

Referring to the drawings there may be seen a vehicle in the form of a pickup having cab 10 with wheels 12. The pickup will have an open box bed 14.

Tail pipe 16 will carry exhaust gasses from the engine and will terminate below the bed 14 and the rear thereof.

Figure 4:
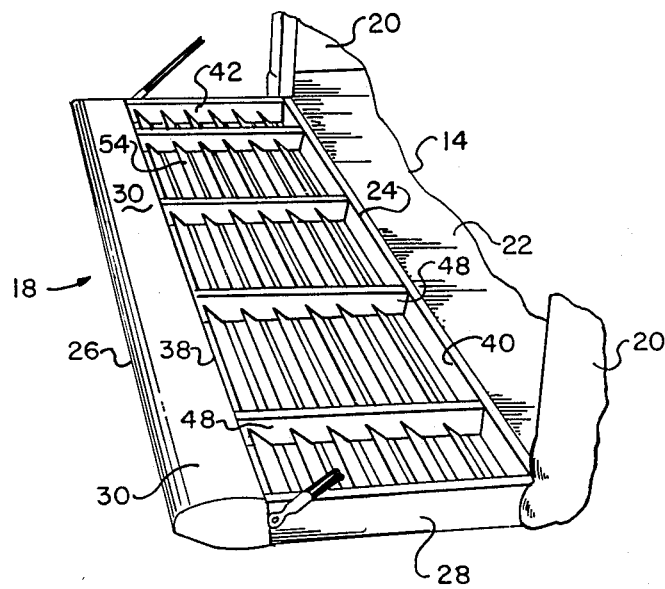
FIG. 4 is a side perspective view of a pickup with a tailgate according to this invention in the down position.

An improved tailgate 18 is attached to the rear of the bed between the side panels 20 of the bed. As is conventional, the tailgate is pivoted to the side panels at the bottom thereof, which is to say, at the same level as the floor 22. Therefore, when the tailgate is open, the top of the open tailgate is level with the floor (FIG. 4). Normally, a tailgate according to this invention will be sold as a replacement for a tailgate which was on the pickup. Therefore, the same hardware which was on the original tailgate is used upon the improved tailgate 18, which is placed there upon. For reasons of economy, the hardware, i.e., the hinges, latches, and latch operator will all be removed from the original tailgate and installed upon the replacement or improved tailgate 18.

The tailgate 18 will be made of metal. The gate will have gate bottom edge 24, gate top edge 26, a two gate side edges 28. The gate will have an inside panel 30 and an outside panel 32. The outside panel will be spaced from the inside panel and have an area equal to the inside panel. By area of the outside panel 32, it is meant the area from the gate top edge 26 to the gate bottom edge 24 and from one gate side edge 28 to the opposite gate side edge 28. As previously stated, the hinge is at the gate bottom edge. A latch will be upon each gate side edge.

The inside and outside panels 30 and 32 will have a rectangular opening therein. The rectangular opening will also have an open top edge 38 and an opening bottom edge 40. The rectangular opening will have opening side edges 42. The area of the opening, which is the area between the open top and bottom edges 38 and 40 and between the open side edges 42 will be about 70% of the area of the panels 30 and 32.

It will be understood that the tailgate 18, which is to say the inside and outside panel, will be rectangular and also the opening will be rectangular. Also, the sides and edges of the opening will be parallel to the sides and edges of the tailgate.

The inside and outside panels 30 and 32 are spaced apart from one another. Metal top strip 44 extends from panels 30 and 32 along the opening top edge 38. In fact, it is formed by bending the inside panel toward the outside panel at this point and welding at the junction of the outside panel and the top strip 44. Also, bottom strip 46 extends from the inside panel 30 to the outside panel 32 along the opening bottom edge 40. The opening side edges are also closed between the inside and outside panels by strips. Four rectangular vertical metal tubular stanchions 48 are supported between the top strip 44 and bottom strip 46. Each stanchion has slots 53 at a 45° angle.

Each of the stanchions are 1"×2" tubular metal. I have good success by cutting the slots 53 from the outside or back edge 50 upward 45° to about 0.3" of the inside edge 52 of the stanchion. For each slot, a louver slat 54 is provided. The louvered slats will be about 3" wide with about 0.2" along one longitudinal edge turned down to form flap 56 as seen in FIGS. 3 and 6. The slats will be width of the opening, i.e., the slats will be slightly less than the distance between the opening side edges 42. As may be seen, when the slats 54 they are inserted into the slots 53, they will extend to the outside of the stanchion for a distance measured along the slat 54 of about 0.4".

Each of the louver slats 54 will have four holes 58 cut therethrough. These four holes will be aligned with bolts 60 which extend longitudinally through the stanchions 48. The bolts pass through holes in the bottom strip 46 and thread into nuts 62, which are attached as by welding to the top or inside of the top strip 44. The stanchions 48 are held in place relative to bolts 60 by alignment caps or plugs 64. With this arrangement, it may be seen that if through accidents or rough handling, one or more of the slats be come bent or dented, the slats can be replaced individually by partial removal of the four bolts 60 and the total removal and replacement of the damaged slat 54.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:
1. A pickup having:
   a. a cab,
   b. an open top box bed,
   c. a metal tailgate at the rear of the bed,
   d. said metal tailgate having:
      i. a gate bottom edge,
      ii. a gate top edge,
      iii. two gate side edges,
      iv. an inside panel having a panel area,
      v. an outside panel spaced from the inside panel;
   e. wherein the improvement comprises:
   f. a rectangular opening having an area of about 70% of the area of the inside panel,
   g. an opening top and bottom edge in the inside and outside panels,
   h. metal top and bottom strips extending from the inside panel to the outside panel at the opening top and bottom edges,
   j. tubular stanchions extending from the top strip to the bottom strip,
   k. alignment plugs in each end of the stanchions, l. a bolt extending through each stanchion alignment plug, and holes in the bottom strip and said bolts threaded into
m. nuts on the top strip,
n. each stanchion having slots extending upward at about 45° from the outside edge of the stanchion to near the inside of the stanchion, and
o. a louver slat in each of the slots in the stanchions,
p. holes in each of the louver slats,
q. said bolts extending through the holes in the louver slats,
r. The rear edge of the louver slats bent downward to form a tab,
s. whereby air is directed downward from the bed and whereas vision is prohibited from the rear of the bed into the bed.

* * * * *